United States Patent
Prum et al.

(10) Patent No.: US 6,311,128 B1
(45) Date of Patent: Oct. 30, 2001

(54) COMBINED NAVIGATION AND MOBILE COMMUNICATION SATELLITE ARCHITECTURE

(75) Inventors: Samuel Prum, Fullerton; Henry V. Bazak, Jr., Palos Verdes Estates; Armando Montalvo, Woodland Hills; Pauline C. Bennett, Los Angeles; Gregory C. Busche, Manhattan Beach, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/498,495

(22) Filed: Feb. 3, 2000

(51) Int. Cl.[7] .............. G01C 21/00; G01S 13/00; G06G 7/00; G06G 17/00; G06G 19/00
(52) U.S. Cl. ............ 701/213; 701/200; 701/214; 701/215; 342/357.01; 342/357.06; 343/853; 343/893; 375/200; 375/211; 375/221; 364/449; 455/426; 455/411; 455/428; 455/437; 455/552; 324/331
(58) Field of Search ................. 701/213, 200, 701/214, 215; 342/357.09, 357.06, 357.01; 343/893, 853; 324/331; 364/449; 455/426, 411, 428, 438, 552; 375/200, 211, 221

(56) References Cited

U.S. PATENT DOCUMENTS

| | | | |
|---|---|---|---|
| 4,814,711 | * 3/1989 | Olsen et al. | 324/331 |
| 5,365,451 | * 11/1994 | Wang et al. | 364/449 |
| 5,552,798 | * 9/1996 | Dietrich et al. | 343/893 |
| 5,619,525 | * 4/1997 | Wiedeman et al. | 375/200 |
| 5,717,830 | * 2/1998 | Sigler et al. | 455/426 |
| 5,832,379 | * 11/1998 | Mallinckrodt | 455/427 |
| 6,067,045 | * 5/2000 | Castelloe et al. | 342/357.09 |

* cited by examiner

Primary Examiner—William A. Cuchlinski, Jr.
Assistant Examiner—Ronnie Mancho
(74) Attorney, Agent, or Firm—Terje Gudmestad

(57) ABSTRACT

A navigation and mobile communication satellite system including a Geo-Mobile (GEM) satellite (14) and a plurality of Global Position System (GPS) satellites (50). The GEM satellite (14) is in operative communication with at least one ground segment (12) and at least one user segment (16), and includes a GEM processor for providing communication services to the user segments (16). The GPS network is also in operative communication with at least one of the user segments (16) and at least one of the ground segments (12). The GPS network provides navigation data to the user segment (16). Each of the ground segments (12) include a gateway station (28) for receiving the navigation data and uplinking the navigation data to the GEM satellite (14) such that the navigation data is rebroadcast to the user segments (16) at a higher power than from the GPS network alone. In this manner, the GEM system provides a navigation signal at a much higher power than the present GPS system. This signal is of sufficient strength to overcome the effects of a lower power signal jammer, which may be effective against the weaker GPS signal.

18 Claims, 2 Drawing Sheets

COMBINED NAVIGATION AND MOBILE COMMUNICATION SATELLITE ARCHITECTURE

TECHNICAL FIELD

The present invention relates to satellite communication systems, and more particularly, to an improved Global Position System (GPS) architecture having robust navigation capability in combination with a mobile communication network.

BACKGROUND OF THE INVENTION

The present GPS navigation network is vulnerable to signal jamming and low signal acquisition probability depending upon the environment with which the user is in. This is due primarily to the low power signals associated with present GPS navigation service. For military applications in particular, there is a need for uninterrupted GPS navigation service with robust anti-jam capability to small, hand held mobile terminals. There is also a need for integrated navigation and mobile communication services into a single such terminal.

DISCLOSURE OF THE INVENTION

Accordingly, it is an object of the present invention to provide an improved GPS network architecture having robust anti-jam capability. Another object is to provide integrated communication and navigation services to mobile user terminals.

According to the present invention, the foregoing and other objects and advantages are attained by a navigation and mobile communication satellite system comprising a Geo-Mobile (GEM) satellite (14) in operative communication with at least one ground segment (12) and at least one user segment (16). The GEM satellite (14) includes a GEM processor for providing communication and navigation services to the user segments (16). A plurality of Global Position System (GPS) satellites (50) are also in operative communication with at least one of the user segments (16) and at least one of the ground segments (12). The GPS satellites (50) provide navigation data to the user segment (16). Each of the ground segments (12) include a gateway station (28) for receiving the navigation data and processing and uplinking the navigation data to the GEM satellite (14) such that the processed navigation data is rebroadcast to the user segment (16) at a higher power than from the GPS satellites (50).

Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF THE INVENTION

Figure 1:
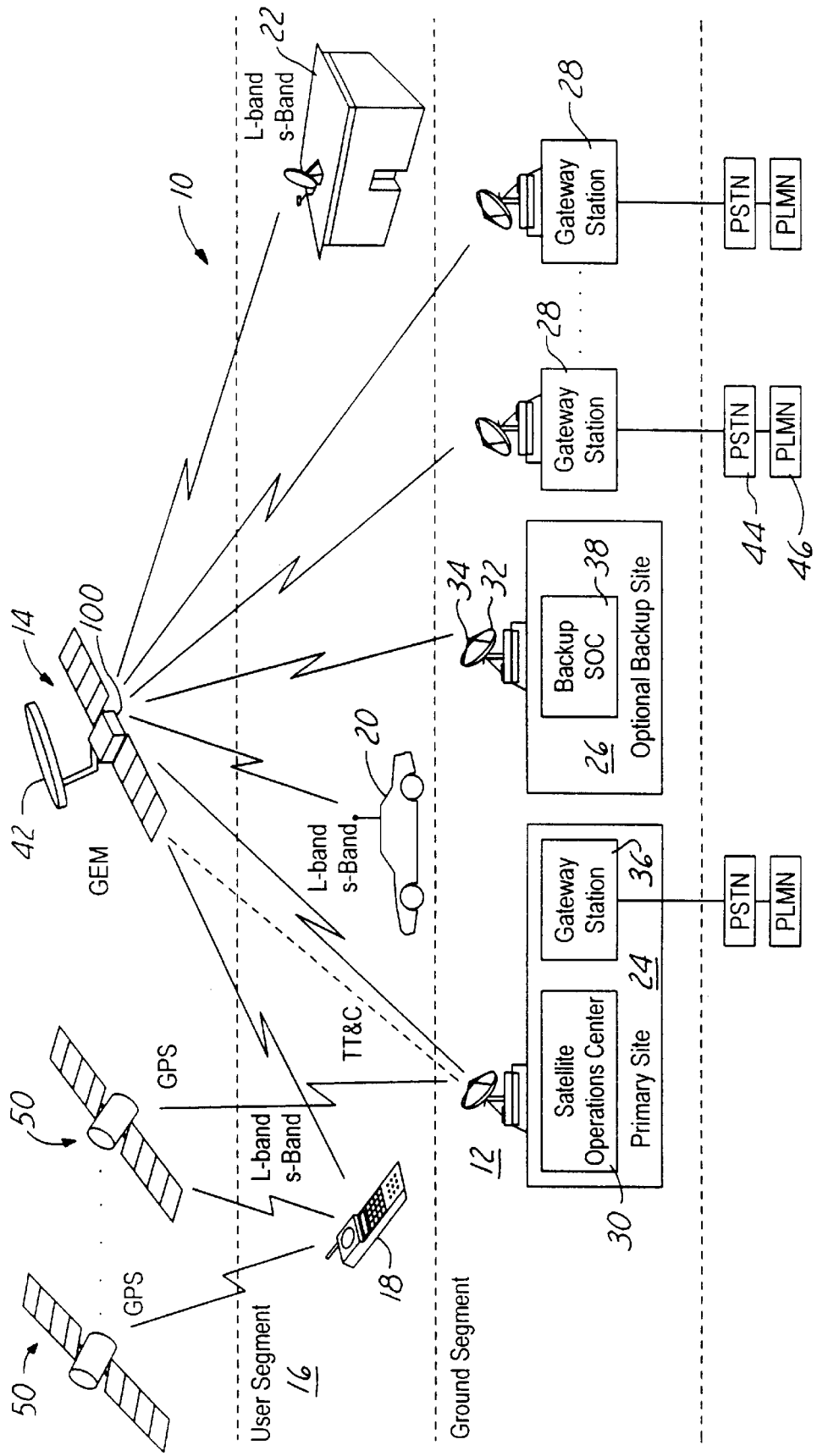
FIG. 1 is a schematic diagram of a combined navigation and mobile communications satellite architecture in accordance with one embodiment of the present invention.

The invention combines the commercial Geo-Mobile (GEM) architecture with Global Position System (GPS) transmit ability integrated into the existing GEM payload operating on the L-band. This architecture, referred to NAV-COMM (Navigational & Communication) 10 is shown in FIG. 1. NAVCOMM 10 supports GPS civil and military missions by providing global reach, preventing disruption with robust anti-jam capability, preventing unauthorized use while maintaining worldwide civilian access, and aiding disadvantaged users in signal acquisition for all environments thereby allowing assured navigation or in-flight retargeting. In addition, the system offers satellite mobile communications capabilities including: voice, facsimile services, supplementary services, netted broadcast voice communications, and point-to-point data transmissions.

The NAVCOMM system uses the high power GEM payload to overcome hostile jammers in the theater of operations and provide for users in low reception areas. The GPS signal is uplinked from a ground segment 12 to the NAVCOMM satellite processor on-board the GEM satellite 14, and rebroadcast down to the user segment 16 in the theater of operations. The rebroadcast signal aids the user terminals in acquiring the current constellation of GPS satellites.

Users access the system at L-band via terminals that are similar to those used with ground-based cellular systems such as handsets 18 or vehicular terminals 20. Users can also access the system from fixed terminals 22. In this case, however, at least some of the user segments 16 such as the handset 18 also include GPS receivers such as are known in the art to provide navigation information to the user.

The ground segment 12 comprises a primary site 24 for satellite control, an optional backup site 26, and a plurality of gateway stations 28. The primary site for satellite control includes the satellite operation center 30 as well as a gateway station 36. The satellite operation center 30 provides telemetry, tracking and control (TT&C) signals to the to the satellite 14.

The optional backup site 26 includes a backup satellite operation center 38. The backup satellite operation center 38 operates in the exact same manner as the satellite operation center 30 of the primary site 24, and become operational in the event that the primary site 24 is disabled or otherwise not functioning properly.

Each gateway station 28, including the gateway station 36 of the primary site 24, is preferably in operative communication with a public switched telephone network (PSTN) 44 and public land mobile network (PLMN) 46. In this manner, each gateway station 28 provides communication services to the user segments 12 via the GEM satellite 14 as is known in the art. A summary of the communication aspects of the GEM satellite system follows.

The GEM components of the NAVCOMM system 10 will be described with reference to FIG. 1. The GEM system is a mobile satellite service that includes a geosynchronous satellite 14 integrated with a ground segment 12 and user segment 16 to provide mobile communication services similar to those provided by terrestrial cellular systems, e.g., voice, data, facsimile, and other supplementary services. The system ground segment 12 includes gateway stations 28 that are interfaced with the PSTN and PLMN so that mobile subscribers can access users of the PSTN and PLMN as well as other GEM mobile subscribers from anywhere within the satellite service region. Users access the system via low power, omni-directional, dual or single mode, terminals 18, 20 that are similar in design to those used with ground-based cellular systems. Dual mode terminals operate with both the GEM system and the local ground-based cellular systems. In the present example, however, at least some of the terminals also include a GPS receiver for receiving navigation data from the GPS network 50.

The space segment consists of a geosynchronous satellite 14 and integrated single large L-band antenna and on-board digital signal processing payload.

The ground segment 12 consists of a primary gateway site 24 and one or more gateway stations 28. Satellite operation center 30 provides overall control of the network and the satellite as well as communication equipment to provide PSTN/PLMN connectivity. Each gateway station 28 includes an antenna 32 and a transmitter 34 to enable communication with the GEM satellite 14 and GPS network.

The communications payload of satellite 14 includes a single L-band antenna aperture 42 for both transmit and receive, and a digital signal processor 100. The large antenna reflector, along with the multi-feed network, and digital beam forming functions, which are performed by the on-board digital processor 100, provides the cellular coverage of the mobile satellite service area with more than 200 beams that are approximately 0.7 degrees in beam width. The L-band coverage area is approximately 12 degrees in diameter as viewed from geosynchronous altitude and could be tailored as allowed by the digital beam forming capability of the system. The system creates a regional cellular coverage pattern that can be deployed anywhere in the world. Mobile users in any given cell are assigned a carrier frequency that is unique within that cell that may be reused, on a non-interfering basis, within another (nonadjacent) system cell. Ku-band coverage is provided to gateways 28 via an area coverage antenna. L-band to L-band links are connected by the satellite processor 100 to support mobile-to-mobile calls at a single hop through to satellite 14. Satellite 14 also provides Ku-band to Ku-band links for an inter network communication subsystem for transmission of control information between the primary gateway site 24 and the gateway stations 28. Beacon tracking stations uplink special L-band signals that the satellite 14 tracks to maintain precise pointing of its mobile link beams.

More than 2000 carriers, each with nominally eight time-division-multiple-access (TDMA) signals, are available to distribute traffic to mobile users in various beams. The network control and resource allocation operations within the primary site 24 and gateway stations 28 dynamically distribute these TDMA signals among the beams in accordance with the instantaneous traffic demand. This traffic demand can be spread non-uniformly across all of the beams covering the GEM system service region.

The system utilizes low rate encoded voice transmission. The terminals 18, 20, 22 may be either single or dual mode. Dual mode terminals allow communications either via the satellite 14 or the local terrestrial cellular system. Mobile switches at the gateway stations 28 support mobility as the users move from beam-to-beam within the coverage area.

The NAVCOMM system 10 augments the existing GPS satellite network to provide more robust GPS communications by combining the communication functions and transmit capabilities of the GEM satellite architecture with the GPS network.

The existing GPS satellite network provides highly accurate, real-time positioning and timing data. The GPS includes a constellation of radio-navigation satellites 50 which continuously transmit precise timing and location information to substantially the entire surface of the earth. Position detectors located within user terminals 18 acquire several transmissions from a corresponding plurality of GPS satellites 50 to determine the location of the user terminal 18. In this case, the positioning data can be used for navigation, mobile communications, in-flight weaponry targeting, as well as digital battlefield synchronization, for example.

In order to make the system compatible with the existing processor design used in the GEM satellite system, it is necessary to preprocess the navigation signal before it is broadcast up to the GEM satellite. This prevents distortion of the wide band navigation signal after it is processed by the GEM on-board digital processor.

Figure 2:
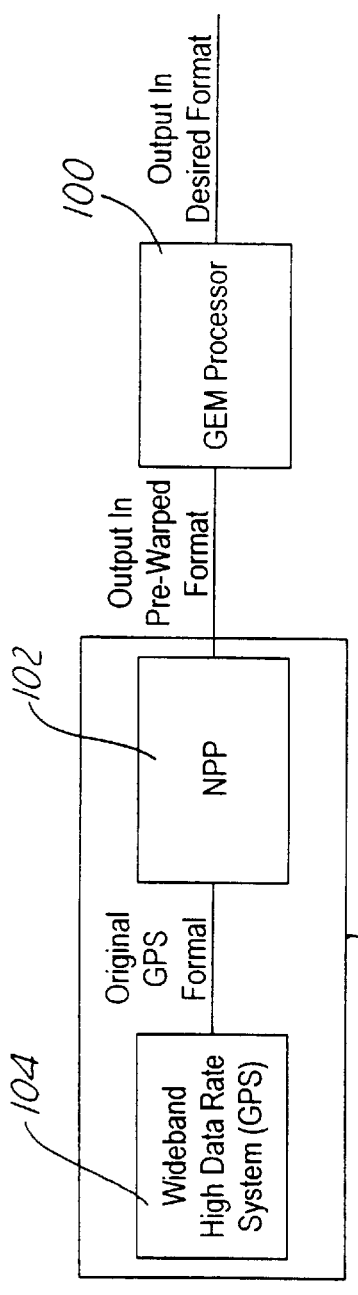
FIG. 2 is a block diagram of portions of the system of FIG. 1.

FIG. 2 shows a schematic block diagram of the preprocessing hardware and software required at the gateway stations 28 to precondition the navigation signal before it is broadcast up to the GEM satellite 14. Referring to FIG. 2, the GEM processor 100 on-board the GEM satellite, expects to receive data in a specific format, i.e., approximately 200 narrow-band channels arranged in approximately 25 MHz of bandwidth. The GEM processor then performs certain linear transformations on the signals. These transformations, when applied to the frequency spectrum of the wide-band, high data-rate system, (the GPS system) creates undesired warping of the frequency spectrum. To accommodate this, a NAVCOMM preprocessor (NPP) 102 is positioned between the output of the wide-band, high data-rate system 104 and the input to the GEM processor 100. The NPP 102 is included as part of the gateway stations 28. The advantage of the NPP 102 is to reduce the need to build a separate space-based processor system for the wide-band, high data-rate system 50 or GEM satellite 14.

Figure 3:
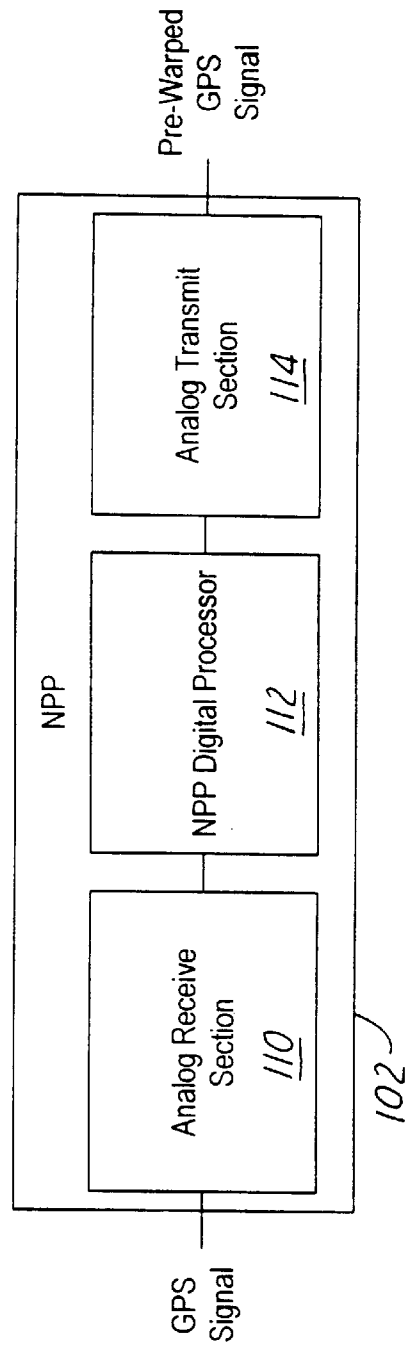
FIG. 3 is a block diagram of a ground segment preprocessor as shown in FIG. 2.

FIG. 3 shows a schematic block diagram of the NPP 102 of FIG. 2. As mentioned above, the function of the NPP 102 is to preprocess the wide-band, high data-rate signal (the GPS data) in such a way that the warping imposed on it by the GEM satellite system processor is nullified or canceled out. One embodiment of the NPP 102 is shown in FIG. 3. In this example, the NPP 102 includes an analog receive section 102, a digital processor 112, and an analog transmit portion 114. The output characteristics of the wide-band, high data-rate system consist of a 20 MHz code-division-multiple-access (CDMA) channel and not more than 5 MHz of spectrum divided into several narrow band channels. In contrast, the GEM processor 100 expects to receive 128, 200 kHz channels in each forward gateway sub-band. Thus, it is necessary to subdivide at least the 20 MHz CDMA channel into smaller spectral sub-bands prior to transmit into the GEM satellite system.

Accordingly, the analog receive section 110 is responsible for performing the frequency conversions from the wide-band, high data-rate transmit band to a lower frequency range suitable for implementing based-band processing. Thus, the analog receive section 110 includes a down conversion stage, a filtering stage, and an amplification stage, although its exact architecture would depend on knowledge of the desired transmit frequency plan of the wide-band, high data-rate system.

The NPP digital processor 112 performs the function of digitizing the based-band version of the wide-band, high data-rate signal such that discreet time frequency manipulations can take place. This would require additional amplification and filtering as well as analog-to-digital conversion. The NPP digital processor 112 divides the wide-band, high data-rate spectrum into 200 kHz slices compatible with the GEM input spectrum channelization. This is accomplished through the use of a Fast Fourier Transform (FFT) algorithm, the implementation of digital filters, and electronic bookkeeping to keep the spectral portions intact such that they can be reassembled at a later time. The NPP digital processor 112 also includes an analog back end consisting of a digital-to-analog stage, an interpolation filter and an amplifier. These components return the newly assembled GEM-like spectrum to the analog transmit section 114 of the NPP 102.

The analog transmit section 114 of the NPP functions to up-convert the NPP baseband output to the expected GEM input spectrum. Analog transmit section 114 accordingly includes an up converter, a filtering stage, and an amplification stage.

Many of the sub-blocks in the NPP processor 102 have counterparts in existing systems designed for the GEM satellite family and as such readily present themselves to these of skill in the art.

The advantage of the above-described architecture is that the GEM system provides a navigation and timing signal at a much higher power (up to +50 dB greater) than the current GPS signal. The present system provides a signal of sufficient strength to overcome the effects of a lower power jammer—one that would be effective against the much weaker GPS signal, but not against the GEM supplied signal. Thus, the system permits the GPS user equipment such as terminal 18 to acquire a GPS timing and aids that equipment in the acquisition of weaker GPS signals. At the same time, however, the system presents users with the full range of communications capabilities. Moreover, since the system incorporates the existing GEM architecture, the system includes the ability to dynamically allocate payload resources to support both navigation and communication demands.

From the foregoing, it will be seen that there has been brought to the art a new and improved GPS communication architecture which overcomes the problem associated with the present GPS architecture. While the invention has been described in connection with one or more embodiments, it will be understood that the invention is not limited to those embodiments. On the contrary, the invention covers all alternative, modifications, and equivalents as may be included within the spirit and scope of the appended claims.

What is claimed is:

1. A navigation and mobile communication satellite system (10) comprising:
    a Geo-Mobile (GEM) satellite (14) in operative communication with at least one ground segment (12) and at least one user segment (16), the GEM satellite (14) including a GEM processor (100) for providing communication and navigation services to said user segments (16);
    a plurality of Global Position System (GPS) satellites (50) in operative communication with at least one of said user segments (16) and at least one of said ground segments (12), said GPS satellites (50) providing wide band, high data rate navigation signals containing navigation data to said user segment (16) and said ground segment (12);
    wherein each of said ground segments (12) include a gateway station (28) for receiving and formatting said wide band, high data rate navigation signals into a GEM processor format and uplinking said navigation data to said GEM satellite (14) such that said navigation processed signals are rebroadcast from said GEM satellite (14) to said user segment (16) at a higher power than from said GPS satellites (50).

2. The navigation and mobile communication system of claim 1 wherein said user segment includes a user terminal having combined navigation and communication capabilities.

3. The navigation and mobile communication system of claim 1 wherein said gateway station (28) includes a preprocessor (102) for receiving said wide-band, high data-rate signals from said GPS satellites (50) and formatting sad signals for reception and processing by said GEM processor.

4. The navigation and mobile communication system of claim 3 wherein said preprocessor comprises an analog receive section, a digital processor and an analog transmit section.

5. The navigation and mobile communication system of claim 4 wherein said analog receive section comprises a down-converter, a filter, and an amplifier for processing said wide-band, high data-rate signal to a lower frequency range suitable for baseband processing.

6. The navigation and mobile communication system of claim 5 wherein said digital processor (112) includes means for digitizing a baseband version of said wide-band, high data-rate signal into discreet time frequencies compatible with an input spectrum channelization of said GEM satellite (14).

7. The navigation and mobile communication system of claim 6 wherein said analog transmit section comprises an up-converter, a filter, and an amplifier for processing said baseband discreet time frequency signals into the input spectrum frequency band of said GEM satellite.

8. The navigation and mobile communication system of claim 1 wherein each of said gateway stations is in operative communication with a public switched telephone network for providing communication signals to said user segments.

9. The navigation and mobile communication system of claim 1 wherein each of said gateway stations is in operative communication with a public land mobile telephone network for providing communication signals to said user segments.

10. The navigation and mobile communication system of claim 1 wherein at least one of said gateway stations includes a satellite operations center for providing telemetry, tracking and control of said GEM satellite.

11. A gateway station (28) for a Geo-Mobile (GEM) satellite system (10) comprising:
    a receiver (110) in operative communication with said GEM satellite (14) and a network of global positioning system (GPS) satellites (50), said GEM satellite (14) providing communication services to a plurality of user terminals (16) and said GPS network (50) providing navigation data to said plurality of user terminals (16);
    a preprocessor (102) for formatting wide-band, high data-rate navigation signals received from said GPS network (50) by said receiver (110) into GEM processor format; and
    a transmitter in operative communication with said GEM satellite (14) for transmitting said processed navigation signals from said preprocessor (102) to said GEM satellite (14) such that said navigation processed signals are rebroadcast to said user terminals (16) at a higher power than from said GPS satellites (50).

12. The gateway station of claim 11 wherein said processor comprises an analog receive section, a digital processor and an analog transmit section.

13. The gateway station of claim 12 wherein said analog receive section comprises a down-converter, a filter, and an amplifier for processing said wide-band, high data-rate signal to a lower frequency range suitable for baseband processing.

14. The gateway station (28) of claim 13 wherein said digital processor (112) includes means for digitizing a baseband version of said wide-band, high data-rate signal into discreet time frequencies compatible with an input spectrum channelization of said GEM satellite (14).

15. The gateway station of claim 14 wherein said analog transmit section comprises an up-converter, a filter, and an amplifier for processing said baseband discreet time frequency signals into the input spectrum frequency band of said GEM satellite.

16. In a Geo-Mobile (GEM) satellite network (10) including a GEM satellite (14) in operative communication with at least one ground segment (12) and at least one user segment (16), an improved Global Position System (GPS) satellite network (50) comprising:

a gateway station (28) in operative communication with said GEM satellite (14) and said GPS satellite network (50), said gateway station (28) providing uplink transmission of processed navigation signals, that are in GEM processor format, from said GPS satellite network (50) to said GEM satellite (14) such that said navigation processed signals are rebroadcast to said user terminals (16) at a higher power than from GPS satellites (50).

17. The GPS satellite network of claim 16 wherein said gateway station includes a preprocessor having an analog receive section, a digital processor and an analog transmit section such that wide-band, high data-rate navigation signals from said GPS satellite network are formatted for reception and rebroadcasting by said GEM satellite.

18. The GPS satellite network of claim 16 wherein said ground segment includes a portable user terminal capable of proving both communication and navigation functions.

* * * * *